US010252901B2

United States Patent
McCrea

(10) Patent No.: US 10,252,901 B2
(45) Date of Patent: Apr. 9, 2019

(54) IMBRUE KEG INFUSION APPARATUS AND SYSTEM

(71) Applicant: IMBRUE SYSTEMS, LLC, Georgetown, DE (US)

(72) Inventor: Brett McCrea, Georgetown, DE (US)

(73) Assignee: IMBRUE SYSTEMS, LLC, Georgetown, DE (US)

( * ) Notice: Subject to any disclaimer, the term of this patent is extended or adjusted under 35 U.S.C. 154(b) by 418 days.

(21) Appl. No.: 14/921,945

(22) PCT Filed: May 1, 2014

(86) PCT No.: PCT/US2014/036295
§ 371 (c)(1),
(2) Date: Oct. 23, 2015

(87) PCT Pub. No.: WO2014/182531
PCT Pub. Date: Nov. 13, 2014

(65) Prior Publication Data
US 2016/0130128 A1    May 12, 2016

Related U.S. Application Data

(63) Continuation of application No. 14/088,799, filed on Nov. 25, 2013, now abandoned.
(Continued)

(51) Int. Cl.
*B67D 1/08*    (2006.01)
*B67D 1/04*    (2006.01)
*C12C 5/02*    (2006.01)

(52) U.S. Cl.
CPC .............. *B67D 1/0801* (2013.01); *B67D 1/04* (2013.01); *C12C 5/026* (2013.01); *B67D 2001/0822* (2013.01)

(58) Field of Classification Search
CPC .............. B67D 1/04; B67D 2001/0822; B67D 1/0801; B65B 31/04; B65D 7/045;
(Continued)

(56) References Cited

U.S. PATENT DOCUMENTS

2004/0069148 A1* 4/2004 Fenaroli ................. A47G 19/16
99/275
2005/0084597 A1* 4/2005 Wasmund, Jr. ........ C12G 3/065
426/592
(Continued)

OTHER PUBLICATIONS

International Search Report, dated Oct. 7, 2014 for International Application No. PCT/US14/36295.

*Primary Examiner* — Ibrahime A Abraham
*Assistant Examiner* — Chris Q Liu
(74) *Attorney, Agent, or Firm* — Lawrence G. Fridman, Esq.; Feigin & Fridman, LLC

(57) ABSTRACT

An infusion keg for a beverage is formed as a cylinder closed at both ends. An interior of the cylinder is purgeable with a purging gas to expel air therefrom and being fillable with the beverage. The keg is also provided with a valve to control entering of the purging gas and the exiting of the beverage; and an infusion port for the insertion of a permeable body having a flavorant therewithin. Upon being purged, a permeable body being inserted, the keg is filled with the beverage that, over a given period of time, absorbs a reproducible volume of the flavorant.

9 Claims, 3 Drawing Sheets

Related U.S. Application Data

(60) Provisional application No. 61/819,845, filed on May 6, 2013.

(58) Field of Classification Search
CPC ........ B65D 85/808; C12C 5/026; C12G 3/06; A23L 3/3427
USPC ........................................ 99/277.1, 323, 317
See application file for complete search history.

(56) References Cited

U.S. PATENT DOCUMENTS

| | | | | |
|---|---|---|---|---|
| 2007/0181009 A1* | 8/2007 | Ranzoni | .................. | A47J 27/62 99/452 |
| 2011/0038989 A1* | 2/2011 | Landman | ............. | B67D 1/0801 426/115 |
| 2011/0101010 A1* | 5/2011 | Maiocco | ............. | B65D 81/245 220/720 |
| 2011/0225725 A1* | 9/2011 | Kersten | .................. | A61H 35/02 4/620 |
| 2013/0264360 A1* | 10/2013 | Astolfi | ................. | B67D 1/0418 222/399 |

\* cited by examiner

IMBRUE KEG INFUSION APPARATUS AND SYSTEM

REFERENCE TO RELATED APPLICATIONS

THIS application IS A CONTINUATION OF PCT APPLICATION NO. PCT/US2014/036295 FILED May 1, 2014 WHICH CLAIMS PRIORITY OF U.S. patent application Ser. No. 14/088,799 FILED Nov. 25, 2013 AND PROVISIONAL PATENT APPLICATION Ser. No. 61/819,845 FILED May 6, 2013, BOTH applications ARE HEREBY INCORPORATED IN THEIR ENTIRETY BY REFERENCE

BACKGROUND OF THE INVENTION

1. Field of the Invention

This invention relates to infusion kegs by which carbonated, finished beer is thoroughly mixed with flavorants prior to consumption.

2. Description of the Related Art

In the past, beer kegs in the U.S. marketplace have reached a particularly high level of standardization, which standardization is based on the taxable unit of a 31-gallon barrel. What has emerged as standard beer kegs are predominantly the ½-barrel (15.5 gallons); the ¼-barrel (7.75 gallons); and the ⅙-barrel (5.167 gallons).

As the flavors and foam of beer is subject to degradation upon exposure to oxygen, beer kegs are filled and deliver beer using a regimen that is a closed system so as to exclude oxygen. This is accomplished by pre-filling kegs with a gas to purge the container which is displaced by incoming finished beer. Similarly, when the keg is tapped at the pub, gas under pressure forces the beer out of the keg to the stein or beer glass.

Beer is also subject to microbial attack and kegs must be readily maintained and maintainable in a sanitary condition. To do this, kegs are structured from food-grade, stainless steel with critical attention paid to weld quality. The welds need to be smooth and devoid of cracks, crevices and pinholes to avoid shadowy areas in which microbial growth can occur. As kegs are recyclable, special attention is paid to sanitizing kegs prior to use.

Infusion systems are known for imparting new and interesting flavor profiles to beverages such as beer. Various ingredients, having desirable aromatic, visual, and/or taste components are used in these systems and methods to augment beverage characteristics. Some methods include soaking ingredients such that oils, juices, and material surface layers are dissolved or stripped. Popular ingredients used for infusion include chocolate, caramel, and coffee.

The concept of infusing beer with a large variety of flavorants is summarized in the patent to C. J. Little in U.S. Pat. No. 8,245,629 (Little '629) entitled Liquid Infusing and Flavoring Device and issued Aug. 21, 2012. By way of background Little '629 indicates that the current known ways of infusing and flavoring beer are a) during the boil; b) infusing when the wort is pumped from the wort kettle; c) at large breweries, adding flavorants at the strainer basket; and, d) during fermentation.

The Little '629 patent device described, is a valved mixing infuser which is operable between an infusing mode and a non-infusing-flavoring mode whereby the keg output is selectively passed through the passageway with the flavorant. In this manner there is little, if any, control over the concentration of the flavorant in the resultant beverage. Thus, the flavor, depending on the pressure and temperature at the time of infusion, could vary substantially.

Because of the effectiveness of infusion, the craft beer industry in the United States has been defined by its variety of unique flavor profiles. Infusion essentially allows a producer of beer to conceive of an infinite array of flavor options without the need and expense of large production runs. Infusion techniques have also proved instrumental in prototyping future beer selections for mass production. These techniques also provide consumers with the ability to customize flavors of beverages. For all of these reasons, infusion is evolving to become a legitimate component of the craft beer industry.

However of great importance in the process, is that, when infusion is used for prototyping, reproducibility of the beer is important as the customer needs the same experience again-and-again when ordering a specific flavor. Equally important, when infusion is used to provide a large variety of flavors, it is a marketing advantage to produce flavored beer in keg quantities.

In the course of preparing this application, several patents, became known to the inventors hereof and are acknowledged hereby:

| Pat. | Inventor | Issue Date |
| --- | --- | --- |
| 4,180,589 | Chicoye et al. | Dec. 25, 1979 |
| 4,440,795 | Goldstein et al. | Apr. 3, 1984 |
| 5,618,572 | Tripp et al. | Apr. 8, 1997 |
| 5,718,161 | Beadle | Feb. 17, 1998 |
| 5,925,563 | Redford | Jul. 20, 1999 |
| 6,644,173 | Lazaris et al. | Nov. 11, 2003 |
| 7,008,652 | Effler | Mar. 7, 2006 |
| 8,245,629 | C. J. Little | Aug. 21, 2012 |

U.S. Pat. No. 4,180,589—Chicoye et al.—Issued Dec. 25, 1971

Discloses a method of preparing a bland beer through controlling the fermentation of the wort under conditions to maintain the dissolved carbon dioxide concentration in the fermenting wort at about 2.1 to about 4.0 cc of dissolved carbon dioxide per cc of wort.

U.S. Pat. No. 4,440,795—Goldstein et al.—Issued Apr. 3, 1984

Discloses a method of preparing a stable citrus flavored alcoholic malt beverage which does not produce off aromas upon storage by removing substantial amounts of sulfur containing amino acids.

U.S. Pat. No. 5,618,572—Tripp et al—Issued Apr. 8, 1997

Discloses a method of preparing a colorless, clear beer through ultra filtration and the addition of dextrins, bittering agents and a foam enhancer. A method of making flavored malt beverages, including a stable citrus flavored malt beverage are also disclosed.

U.S. Pat. No. 5,718,161—Beadle—Issued Feb. 17, 1998

Discloses a beer brewing system that utilizes a cooker to heat water and pre-blend syrup of ingredients. Once boiled, the mixture is transferred to a brewing vessel for oxygenation and fermentation and then stored in a keg with a mixture of sugar and gelatin to age and clarify.

U.S. Pat. No. 5,925,563—Redford—Issued Jul. 20, 1999

Discloses a multi-stage column continuous fermentation system for brewing beer comprising interconnected stages including a discharge stage, feed stage, fermentation state, top stage and a carbon dioxide discharge column.

U.S. Pat. No. 6,644,173—Lazaris et al—Issued Nov. 11, 2003

Discloses a beverage filter cartridge holder with two chambers—the first chamber containing a dry beverage medium and the second for receiving the brewed beverage after filtration through the filter separating the first and second chamber.

U.S. Pat. No. 7,008,652—Effler—Mar. 7, 2006

Discloses a method of producing a flavorless, odorless and colorless malt base by preheating a malt base in an aqueous solution with activated charcoal absorbent to remove protein in the presence of yeast to convert carbohydrates to ethyl alcohol.

Various methods and products are known for amplifying complementary flavors of mainline beers. Unfortunately, many of these methods involve expensive and complicated brewing procedures and are frequently limited to mass production. Products such as beer infusion tubes have a more user-friendly scale that allows for the infusion of two to five twelve-ounce beers. Unfortunately these types of products are short-lived. They also can cause deleterious effects (i.e., the loss of carbonation), which occur almost immediately. While vessels such as Cornelius kegs allow a brewer to custom manufacture infused beers, Cornelius kegs are not compatible with commercial draft systems.

For these reasons, among others, there is a clear and defined need for improved infusion systems for beverages. The present invention fulfills this need and provides further related advantages, as described below.

SUMMARY OF THE INVENTION

One aspect of the invention provides a beer keg which is utilized to infuse flavorants into beer, preferably into fresh, filtered and carbonated beer. The kegs are designed to be filled at the brite (or bright) tank, held for an infusion period that ensures uniform and reproducible absorption of the flavor, and shipped to the dispensing point where it is enjoyed by the beer-drinking patron.

As to another aspect of the invention, the keg of this invention is a cylinder closed at both ends with the cylinder formed from a food-grade material, such as food-grade stainless steel. An essential factor is enabling the transport of a flavored beer while maintaining the familiar foamy head. Thus, the preferred procedure before the fresh beer in introduced into the keg is to purge the keg and pre-load the infusant into the substantially oxygen-free environment.

As to a further aspect, the keg is constructed with an infusion port which is formed as an opening in the keg wall. The port has an annular collar attached at one edge thereof to the opening. The opposite the edge has an outwardly extending rim. This rim together with a gasketed cap is encaptured by a clamp device.

As to still another aspect of the invention, a clamp device is provided for encircling and securing the rim of the annular collar and the perimeter of the gasketed cap is a Tri-Clamp® unit. The clamp enables the maintaining of the required pressure characteristics of the keg and is modified to provide a security chain and a hasp for the customer's padlock.

As to still further aspect of the invention, upon being purged and the permeable flavorant-containing body being inserted, the keg is filled with beer driving out the purging gases. Over a given period of time, the beer absorbs a substantially reproducible volume of flavorant and the flavored beer is deliverable without losing carbonation.

Yet another aspect of the invention provides a keg modification kit for an infusion beer keg for use with a standard keg is also described herein. The keg modification kit for use with a standard keg consists of: (a) an annular collar for attachment at one edge thereof to an aperture in the standard keg and coextensive therewith, the opposite edge of the annular collar having an outwardly extending rim; (b) a gasketed cap coextensive with the outwardly extended rim of the annular collar and lockable to the annular collar; (c) a clamp device for encircling the rim of the annular collar and the perimetric region of the gasketed cap for locking the one to the other. The cap is constructed with a bracket for attachment of a permeable body. The keg modification kit optionally includes a permeable flavorant container for attachment to the bracket on the gasketed cap.

As to yet a further aspect of the invention, a collar assembly is provided consisting of a collar of a substantial diameter extending outwardly from the body of the keg and adapted for connection with a closure sub-assembly. External threads are arranged at an outer part of the collar. A closure sub-assembly includes a tightening element and a disc-shape closing member adapted to be received within inner space of the tightening element. A connecting collar extends outwardly from a body of the tightening element. An inner surface of the connecting collar is formed with internal threads adapted for engagement with the external threads of the outer part of the collar.

As to still further aspect, the infusion beer keg receives a purging gas substantially free of oxygen and having a flavorant therewithin. The invention also provides a keg with a permeable container filled with a desired flavorant. So that upon carbonated beer being introduced into the keg, the system of the invention will reproducibly infuse a predetermined quantity of flavorant into the resultant beverage.

Yet another aspect of the invention, is that the permeable container would be situated medial the beer keg so that upon operation, the infusion does not interfere with the beer keg siphon. The infusion keg hereof is constructed after purging to operate at pressures substantially above ambient and thereby retain carbonation in the resultant beverage. The invention provides an infusion beer keg constructed from food-grade stainless steel which is recyclable and readily to be sanitized. The components of the infusion beer kegs are smooth and free of cracks, crevices, pinholes, scale, projections, staining and splatter which would support microbial growth, so as to further improve sanitizing aspects of the process.

DETAIL DESCRIPTION OF THE INVENTION

Figure 1:
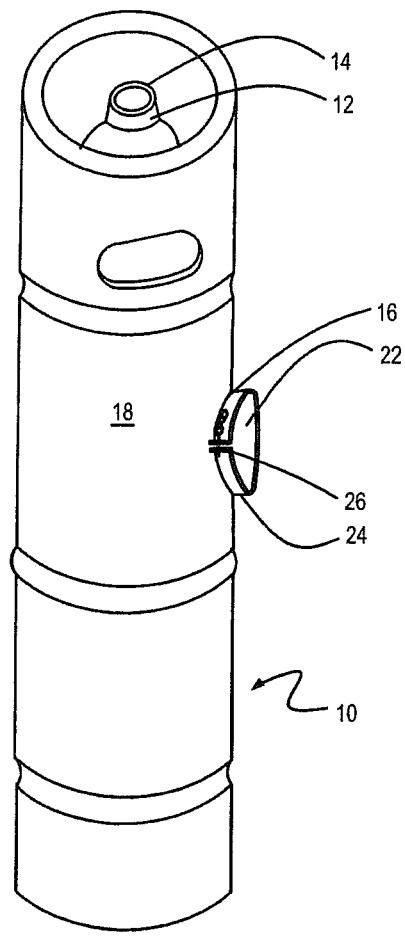
FIG. 1 is a perspective view of a first embodiment of the infusion keg.

For purposes of this disclosure, the infusion keg is defined as a closed cylinder wherein the wall thereof has three portions, namely, a sidewall extending from the top wall portion closing one end thereof and a bottom wall portion closing the other end thereof. Thus "wall" where used herein refers to all three portions of the closed cylinder and not solely to the sidewall. Referring to FIG. 1, there is shown an infusion beer keg 10 with a neck 12 affixed to the top of the keg by welding. Secured to the neck is a valve assembly 14, which valve assembly is described in greater detail hereinbelow.

An aperture or infusion port 16 is present in the wall 18 of the keg 10 on which is mounted a collar 20 by welding thereto. The port 16 is sealable by a gasketed sanitary cap 22 and a clamp 24. The clamp 24 is designed for pressurized vessels and is commonly known as a "triclamp" Additionally, a hasp 26 is provided for a padlock (not shown).

As noted in the introductory portion of this patent, the beer kegs in the United States have undergone a substantial degree of standardization and, while this invention is shown against a background of a particular key size, namely, a one-sixth barrel or "sixtel," the invention is applicable to all U.S. and European keg sizes.

Because beer kegs are recyclable, the weldments need to conform to food sanitation requirements. Thus, all welds need to be free of cracks, crevices, pinholes, scale, projections, staining, and splatter and thereby eliminate shadow areas at which microbial activity could thrive.

Figure 2:
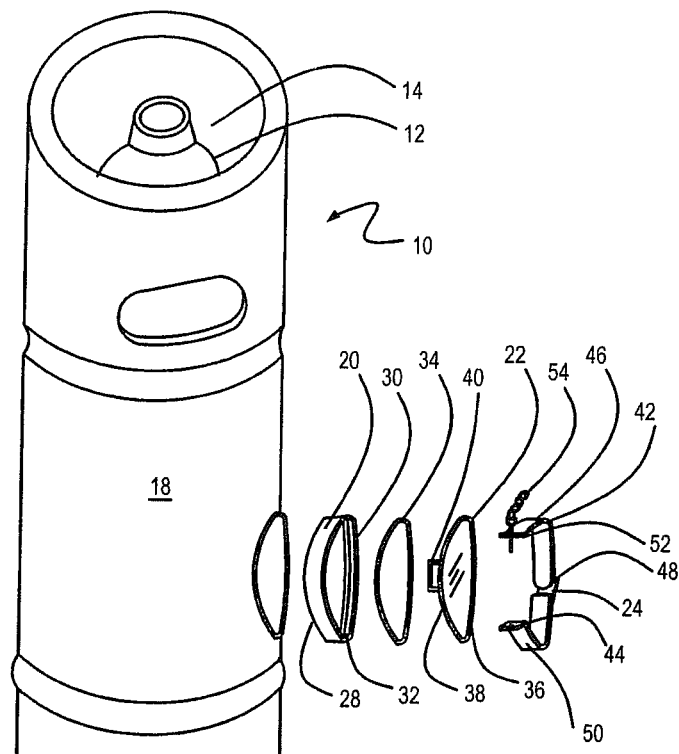
FIG. 2 is an exploded view of the infusion keg of FIG. 1, showing details of the infusion port and the closure therefore.

Referring now to FIG. 2 and exploded view showing details of the infusion port is given. The collar 20 is constructed with an undulating or inner edge 28 that fits up to the aperture or infusion port 16. For compliance with weights and measures regulations, the internal volume of the port can be varied to allow for volume displaced by the permeable body (see below). In this configuration, the outer edge 30 of the collar 20 is formed into an outwardly extending rim 32 for engaging clamp 24.

The sanitary cap 22 is coextensive with the external edge of rim 32 of collar 20 and, when assembled to the collar 20, is provided with O-ring gasket 34 inserted between the perimeter region 36 of sanitary cap 22. The sanitary cap 22 has welded to the interior surface 38 thereof a bracket 40 from which a permeable flavorant container is suspended for disposition within the keg 10 while it is thought that the displacement of fluid in the keg by the permeable flavorant container compensates for the volume added by the infusion port 16 and collar 20, any excess volume is compensable by a molded plug of sanitizable gasketing material which includes the O-ring 34.

To secure sanitary cap 22 and gasket 34, a clamp assembly 24 is employed. The clamp assembly 24 is manufactured by Alfa Laval, Inc., 5400 International Trade Drive, Richmond, Va. 23231, under the Tri-Clamp® trademark and has clamps for 2", 3" and 4" diameter ports of pressurized vessels. The clamp assembly 24 is rated to withstand pressures up to 60 psi. The clamp 24 is constructed with and internal channel 42 which engirdles rim 30 of collar 20 and perimetric region 36 of sanitary cap 22. To accomplish this, the clamp 24 has two semicircular portions 44 and 46, hingedly attached the one to the other at hinge 48. The semicircular portion 44 has a captive thumbscrew 50 which engages internally threaded receptacle 52 of semicircular portion 46. A security chain 54 is provided for the padlock of the customer (not shown).

Figure 3:
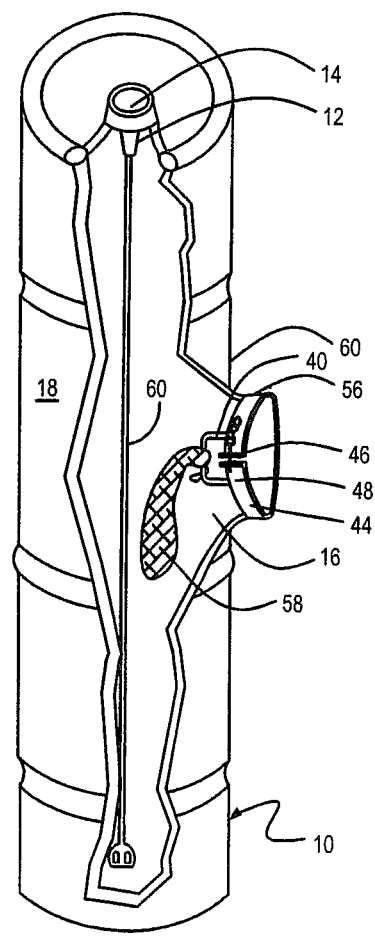
FIG. 3 is a cutaway view of the infusion keg of FIG. 1, showing the permeable flavorant container within the keg.
Figure 4:
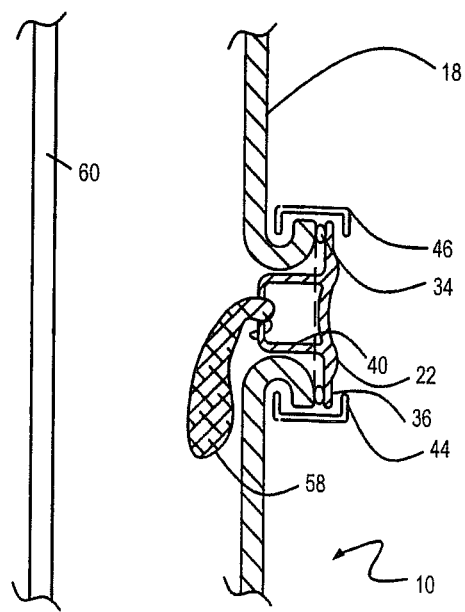
FIG. 4 is a partial cross-sectional view of the infusion keg of FIG. 1, showing additional details of the infusion port.

Referring now to FIGS. 3 and 4, a cutaway view and a cross-sectional view are shown to illustrate the details of the infusion process and further details of construction of the port. In the cutaway view, the interior smoothness of the top and bottom of the keg becomes apparent which configuration, upon recycling the keg, facilitates cleaning and sanitizing. While this feature has become widely accepted, upon adding infusion port 16, the weldment 56 of port 16 is finished to the same standard so as not to create a "shadowy" area.

FIGS. 3 and 4 show the permeable flavorant container 58 tied to and depending from bracket 40. In the instant example, a food-grade cheesecloth bag or sock is utilized and is draped in the interstitial space between the beer keg spear or siphon 60 and the beer keg wall 18. For proper infusion it is important that the container 58 be suspended in the manner shown so as not to interfere with the operation of the spear 60.

Referring again to FIGS. 1 through 4, a kit for the modification of standard kegs is now described. For each of the U.S. standard beer kegs—the ½-barrel (15.5 gallons); the ¼-barrel (7.75 gallons); and the ⅙-barrel (5.167 gallons)—the kit is substantially the same except for the curvature of the annular collar edge to be welded to the keg wall.

The keg modification kit for use with a standard keg consists of: (a) an annular collar 20 for attachment at one edge 28 thereof to an aperture 16 in the standard keg and coextensive therewith, the opposite edge 30 of the annular collar 20 having an outwardly extending rim 32; (b) a gasketed cap 22 and 34 coextensive with the outwardly extended rim 32 of the annular collar 20 and lockable to the annular collar 20; (c) a clamp device 44, 46 and 48 for encircling the rim 32 of the annular collar 20 and the perimetric region 36 of the gasketed cap 22 and 34 for locking the one to the other. The cap 22 is constructed with a bracket 40 for attachment of a permeable body.

The keg modification kit optionally includes a permeable flavorant container 58 for attachment to the bracket 40 on the gasketed cap 22 and 34.

Figure 5:
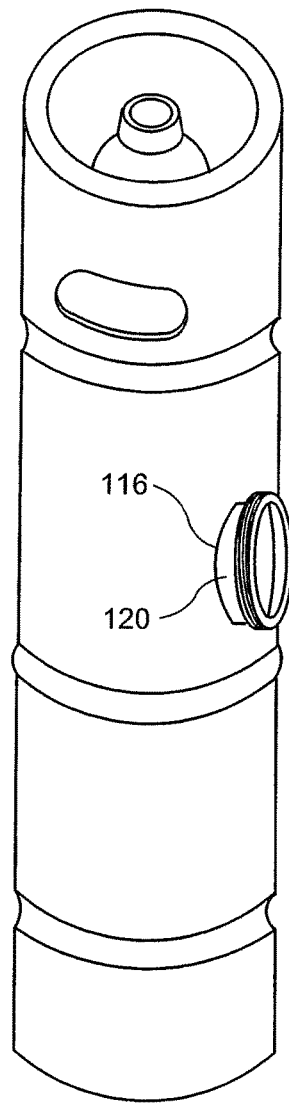
FIG. 5 is an exploded view of another embodiment of the infusion keg of the invention.
Figure 7:
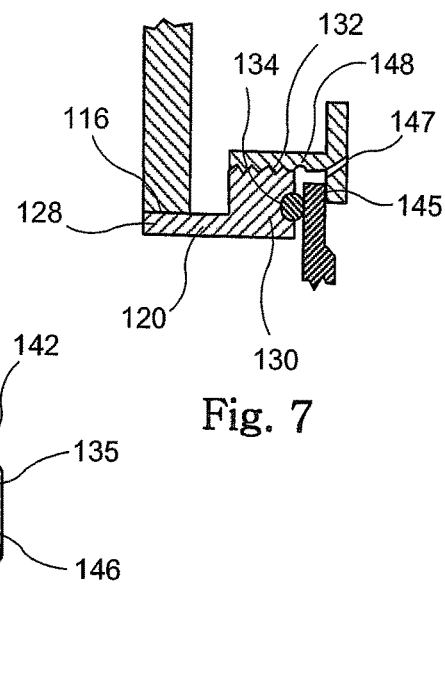
FIG. 7 is an enlarged view of a detail shown in FIG. 6.
Figure 6:
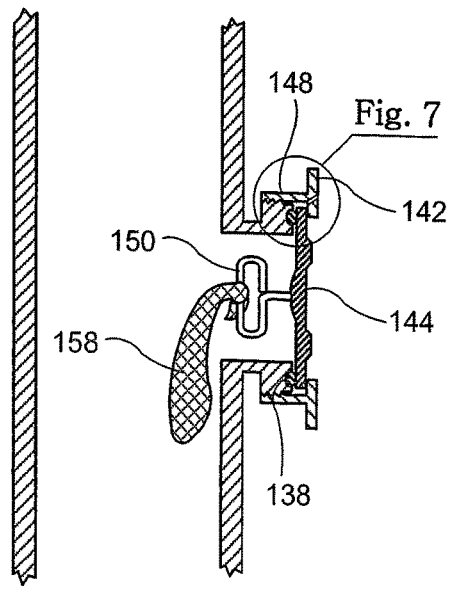
FIG. 6 is a partial cross-sectional view of the infusion keg of FIG. 5 showing details of its assembly.

Referring now to FIGS. 5-7, illustrating another embodiment of the infusion keg 110 of the invention designed as a closed cylindrical body defined by the walls thereof. A collar 120 extends outwardly from the cylindrical body and is adapted for cooperation with a closure sub-assembly 140. The collar 120 of substantial diameter is constructed with an inner part 128, adapted for connection with the aperture or infusion port 116 formed in the body, and the outer part 130. External threads 132 are arranged at the outer part 130 and a groove 134 is formed at an outer edge 136 thereof adapted for receiving a resilient gasket 138. In one embodiment of the invention, the gasket is made from silicone. A closure sub-assembly 140 consists of a tightening element 142 and a disc-shaped closing member 144 adapted to be received within an inner space 145 of the tightening element. An operational opening 146 is surrounded by a substantially cylindrical connecting collar 148 extending outwardly from the body of the tightening element 142. The circumferential inner space 145 separates the connecting collar 148 from the opening 146. The disc-shaped closing element 144 is adapted for close engagement with the inner space 145. Internal threads 135 arranged at an inner area of the connecting collar 148 are adapted for cooperation with the external threads 132 of the collar 120.

A mounting bracket 150 extends outwardly from an inner surface of the closing member 144 and is provided to facilitate suspension of the flavorant container 158 within an interior of the keg of the invention. The mount point defined by the bracket 150 is essential because the container 158 suspended in this manner does not interfere with operation of the keg 110. This is especially essential when the keg is positioned upside down, as may be required in operation of the keg of the invention, so that the flavorant ingredients will not become loose.

In view of the adjustable connection between the outer part 130 of the collar and the tightening element 142, position of the closing member 144 and the mounting bracket 150 can be rotatably adjusted within the closure sub-assembly 140. For example, a required angular orientation of the mounting bracket 150 relative to the inner space 145 can be selected and fixed upon tightening the treadable connection. Such rotational adjustment of the bracket 150 is translated into the adjustment of the flavorant container position (suspended from the mounting bracket 150) within the interior of the keg, so as to further improve quality of the flavoring process.

The substantially cylindrical collar 120 has an inner diameter which is greater than the respective collar diameter of the previous embodiment. Furthermore, the Tinier extension of the collar 120 from the keg body is less than the Tinier extension of the collar in the previously discussed embodiments. Although the inner diameters of the collar 120 may vary, in one embodiment of the invention such diameter is about 6". This rather substantial inner diameter facilitates placement of numerous flavorant bags within a particular unit, without having difficulty in removing such bags after completion of the cycle. Furthermore, the greater inner diameter of the collar, the more beer can be placed within the interior space and more uniform the infusion of the beer is being performed within the keg.

Limited linear extension of the collar 120 from the body of the keg is resulted in the design which simplifies transportation, enabling an operator to more efficiently arrange multiple kegs on a transportation pallet.

Although various shapes of the tightening element 142 are contemplated, in the embodiment illustrated in FIGS. 5 and 6, the exterior of the tightening element 142 has a multi-faceted configuration. A pressure relief valve or arrangement 147 is formed within the inner space of the tightening element. In this manner, pressurized fluids can be released from the inner space of the keg to the atmosphere. In view of the substantial diameter of the collar 120, manufacturing process is simplified, since laser-type equipment can be utilized to form the aperture or infusion port adapted to receive the inner part 128. This makes connecting welds between the collar 120 and the infusion port 116 smooth and less prone to bacterial and other microbiological infections on the exterior and interior of the keg. Furthermore, limited linear extension of the collar 120 from the keg body simplifies cleaning.

The resilient gasket 138 interposed between the outer edge 136 of the collar and the inner surface of the closing member 144, further facilitates a proper sealing. The gasket-inner space interface forms air and liquid-tight seal, preventing leak of the pressurized fluids from the interior of the keg.

The threaded connection between the collar 120 and the closure sub-assembly 140, substantially simplifies operation and maintenance of this embodiment through the efficient tightening of the entire assembly. The multifaceted shape of the tightening element 142, allows the threaded elements to be tightened by a hand of an operator. As this assembly is completely tightened through the threadable engagement between the external threads 132 of the collar 120 and the internal threads 135 of the connecting collar 148 and driving pressure by which the beer is evacuated out of the keg is elevated, pressure built up generated within the interior of the keg generates friction between the tightening elements 142 and the closing member 144 preventing unauthorized opening of the system.

The adjustable and threadable arrangement between the outer part 130 of the collar and the tightening element 142, is essential for this embodiment. When the required torque is applied to the tightening element, the entire system is kept in place to ensure that all components are properly seated and sealed and the keg does not leak. Internal pressure resulted from operation of the keg is resulted in a substantial friction between the elements of the assembly. The generated friction is substantial, especially when temperature in the interior of the keg is above normal. As a safety feature, such friction between the elements of the system prevents unauthorized access to the interior of the assembly.

Although the keg infusion system and apparatus of the invention have been described with reference to beer, it should be obvious that the system is also applicable and can be used with a broad spectrum of drinks including alcoholic beverages such as ciders (apple, pear, etc.) and meads, as well as non-alcoholic beverages; it can also be used for carbonated and non-carbonated cocktails, mixed drinks, etc. Thus, at the bars and restaurants with high volume of serving drinks, an operator does not have to worry about mixing drinks each time and over pouring. In such application the non-carbonated cocktails, mixed drinks, etc. are poured out of a tap system.

It is known that a great deal of profit is lost in the restaurant business due to over pouring. With the particular system of the invention, the user is able to have precise measurements and mixtures in a keg provided.

With the system of the invention, especially at high volume establishments having the carbonated and non-carbonated mixed drinks previously prepared and on draft ready to serve, saves not only time, but it allows the precise amount of liquor to be used with no over pouring. This prevents substantial loss of money. Thus, the invention provides a controlled way of distribution of various types of drinks and is not limited to beer only.

What is claimed is:
1. A keg for containing a beverage, comprising:
   a closed cylinder having a sidewall portion, a top wall closure portion, and a bottom wall closure portion, the closed cylinder formed from a food-grade material, the closed cylinder being purgeable with purging gas to expel air therefrom and being fillable with a beverage;
   a valve disposed at the top wall closure portion configured to control entering of the purging gas and exiting of the beverage;
   an infusion port disposed in the sidewall portion of the closed cylinder;
   a cylindrical collar, having an inner part attached at to said infusion port and an outer part;
   a closure sub-assembly, including:
      a planar tightening element formed with a circular operation opening;
      a connecting collar extending outwardly from a planar surface of the planar tightening element to surround the operation opening and to be spaced therefrom, so as to define an inner space;
      a disc shaped closing member adapted to be received within the inner space;
      a mounting bracket disposed on the disc shaped closing member and extending within said inner space of said connecting collar, and said mounting bracket extends outwardly from an inner surface of the disc shaped closing member facing into an interior of the keg; and a fluid-permeable flavorant container containing a flavorant therein supported and suspended by the mounting bracket within the interior of the keg, wherein a position of said mounting bracket and the fluid-permeable flavorant container is adjustable upon the disc shaped closing member within the inner space of the closure sub-assembly, wherein a placement of the fluid-permeable flavorant container does not interfere with dispensing of the beverage in the keg.

2. The keg of claim 1, wherein the food-grade material is stainless steel; stainless steel is selected from a group consisting of 304, 18/8, 316, 18/10 and 430.

3. The keg of claim 1, wherein:
the outer part of the cylindrical collar is formed with external threads adapted for cooperation with internal threads formed within an inner area of the connecting collar,
an outer edge of said outer part of the cylindrical collar is formed with a groove adapted to receive a resilient member,
whereby upon tightening of the threaded connection between the cylindrical collar and the closure sub-assembly, the gasket resilient member is interposed between the outer edge of the cylindrical collar and an inner surface of the disc shaped closing member, so as to form air and liquid tight seal therebetween.

4. The keg of claim 1, wherein the fluid-permeable flavorant container, which is a food-grade cheesecloth bag dimensioned to depend into the keg without interfering with operation off the keg.

5. The keg of claim 1, wherein the keg is constructed to operate at pressures up to 60 psi.

6. The keg of claim 1, wherein said disc shaped closing member does not extend beyond said planar tightening element outwardly away from the keg.

7. The keg of claim 1, wherein said mounting bracket is in a form of a loop-shaped bend to hold said fluid-permeable flavorant container.

8. A standard keg, having:
a cylindrical body closed at the top end and the bottom end, the cylindrical body formed from a food-grade stainless steel, the keg being pressure-rated and purgeable with purging gas to expel air therefrom and being fillable with a beverage in a oxygen-free environment;
a valve disposed at the top end of the cylindrical body configured to control entering of the purging gas and the exiting of the beverage;
a cylindrical collar for attachment at one edge thereof to an aperture in the standard keg and coextensive therewith, the cylindrical collar including: an inner part configured to connect with the aperture, and an outer part; and
a closure sub-assembly, including:
a planar tightening element formed a circular operation opening;
a connecting collar extending outwardly from a planar surface of the planar tightening element to surround the operation opening and to be spaced therefrom, so as to define an inner space;
a disc shaped closing member being adapted to be received within the inner space;
a mounting bracket disposed on the disc shaped closing member and extending within said inner space of said connecting collar, and said mounting bracket extends outwardly from an inner surface of the disc shaped closing member facing into an interior of the keg; and
a fluid-permeable flavorant container containing a flavorant therein supported and suspended by the mounting bracket within the interior of the keg, and wherein a position of said mounting bracket and the fluid-permeable flavorant container is adjustable upon the disc shaped closing member within the inner space of the closure sub-assembly;
wherein the outer part of the cylindrical collar is formed with external threads adapted for cooperation with internal threads formed within an inner area of the connecting collar;
wherein an outer edge of outer part of the substantially cylindrical collar is formed with a groove adapted to receive a resilient member;
whereby upon tightening of the threaded connection between the cylindrical collar and the closure sub-assembly, the resilient element is interposed between the outer edge of the cylindrical collar and an inner surface of the disc shaped closing member, so as to form air and liquid tight seal therebetween;
and wherein the fluid-permeable flavorant container attached to said mounting bracket does not interfere with dispensing of a beverage from said keg.

9. The keg modification kit of claim 8, wherein the fluid-permeable flavorant container is a food-grade cheesecloth bag dimensioned to depend into the keg without interfering with operation of the standard keg.

* * * * *